United States Patent
Tylaska et al.

(10) Patent No.: US 7,076,845 B2
(45) Date of Patent: Jul. 18, 2006

(54) MECHANICAL KNOT APPARATUS

(75) Inventors: Timothy T. Tylaska, 138 N. Stonington Rd., Mystic, CT (US) 06355; Barry L. Hull, Groton, CT (US)

(73) Assignee: Timothy T. Tylaska, Mystic, CT (US)

( * ) Notice: Subject to any disclaimer, the term of this patent is extended or adjusted under 35 U.S.C. 154(b) by 34 days.

(21) Appl. No.: 10/755,861

(22) Filed: Jan. 12, 2004

(65) Prior Publication Data

US 2004/0194259 A1    Oct. 7, 2004

Related U.S. Application Data

(60) Provisional application No. 60/439,787, filed on Jan. 13, 2003.

(51) Int. Cl.
*F16G 11/00* (2006.01)

(52) U.S. Cl. .................................. 24/135 N

(58) Field of Classification Search .............. 24/115 R, 24/129 R, 129 D, 136 R, 136 B, 115 K, 24/115 H, 135 N, 135 R, 135 K, 135 A
See application file for complete search history.

(56) References Cited

U.S. PATENT DOCUMENTS

| | | |
|---|---|---|
| 525,770 A | 9/1894 | Parker |
| 749,847 A | 1/1904 | Curtis |

(Continued)

OTHER PUBLICATIONS

Cable attachment device; picture obtained from website of manufacturer, Tseil Tonshoff, www.tseil.de and attached hereto.

*Primary Examiner*—Robert J. Sandy
*Assistant Examiner*—Ruth C. Rodriguez
(74) *Attorney, Agent, or Firm*—William B. Ritchie (57) ABSTRACT

A mechanical knot apparatus for replacing the use of a conventional knot or fitting for fastening or securing a rope or cable to an object. A spool-like body with a slot or two holes bored crosswise across the middle of the spool perpendicular to its axis is provided. A loop is first formed in the rope by either splicing or by simply creating a loop with the use of a knot. The end of the loop is passed through the slot or holes in the spool and then passed around the object to be secured. The loop is then wrapped back over the flanges of the spool to create a hitch-like configuration. When tension is applied, the rope slips through the device until flanges or body of the spool seats against the object being secured. A secondary tightly fitting flexible ring such as a rubber "O" ring is optionally slipped around the root of the loop and can be slid up against the hitch to act as a "lock" which prevents the loop from bouncing off the flanges of the spool during severe flogging. To detach the device, the two legs of rope loop initiating from its root are bent back and around the cylindrical body of the spool between the two flanges. The end of the loop is then rolled back over these two legs of rope as in a way similar to "breaking the back" of a bowline knot. This results in enough free slack to allow the end of the loop to be slipped back over the flanges of the spool whereas the loop can now be slipped off the secured object. Unlike a rope knot, the body of the spool is solid and basically incompressible. This prevents the rope from jamming into itself and allows the device to be easily detached even after tremendous loads.

3 Claims, 8 Drawing Sheets

U.S. PATENT DOCUMENTS

| | | |
|---|---|---|
| 1,057,484 A * | 4/1913 | Huber ................... 24/135 N |
| 1,379,093 A * | 5/1921 | Freeberg ................ 24/115 G |
| 1,452,338 A | 4/1923 | Flowers |
| 1,613,635 A | 1/1927 | Zimmerlund |
| 1,718,641 A | 6/1929 | Forman |
| 2,538,508 A * | 1/1951 | Di Palma ................ 24/129 R |
| 2,595,806 A | 5/1952 | Morris |
| 3,094,755 A | 6/1963 | Casanave |
| 3,813,737 A * | 6/1974 | Larsen ................... 24/129 R |
| 4,342,477 A * | 8/1982 | McClure ................. 24/135 N |
| 4,872,240 A | 10/1989 | Spinner et al. |
| 4,907,322 A * | 3/1990 | Kanno ................... 24/135 N |
| 4,918,785 A | 4/1990 | Spinner et al. |
| 5,398,391 A * | 3/1995 | Yokochi ................. 24/116 A |
| 5,577,299 A | 11/1996 | Thompson et al. |
| 5,588,190 A * | 12/1996 | Sato ..................... 24/135 N |
| 5,766,700 A | 6/1998 | Borcherds |
| 5,769,475 A | 6/1998 | Tylaska |
| 6,192,558 B1 | 2/2001 | Badura |
| 6,460,226 B1 | 10/2002 | Smith et al. |
| 2003/0145435 A1* | 8/2003 | Carver ................... 24/115 F |

* cited by examiner

MECHANICAL KNOT APPARATUS

This application claims benefit of U.S. Provisional Application Ser. No. 60/439,787, filed Jan. 13, 2003, pursuant to 35 USC §119(e).

BACKGROUND OF INVENTION

1. Field of the Invention

This invention relates to a mechanical knot which may be used to fasten a rope or cable to an object and which is capable of being quickly and easily detached even after the rope or cable has experienced considerable tension or strain.

2. Description of the Related Art

In many applications, including the field of sailing, it is desired to attach and detach a line, rope or cable to another object with a minimum of effort. One of the simplest and most commons means of attachment consists of tying a knot in the rope. While effective, a knot has the drawback of being very difficult to untie after the rope has been subject to tension. With today's synthetic materials such as KEVLAR or VECTRAN, such knots are for all practical purposes impossible to untie. A spiced joint is fine for attachment but does not allow detachment.

Another method of attaching a rope to an object uses an auxiliary fitting such as a shackle. The rope is either permanently or semi-permanently tied or spliced to the shackle. The shackle and not the rope is then used as the attachment or detachment point. U.S Pat. No. 5,769,475 issued to Tylaska on Jun. 23, 1998 discloses a snap shackle which provides an easy connection to secure a rope to an object. Such auxiliary fittings have the drawback of being both expensive and heavy. In some fields such as the field of sailing it is desired to utilize a connection with as little weight as possible so as to maximize performance. Also in the field of sailing it is desirable to minimize weight so as to prevent damage or danger from free-swinging ropes. The auxiliary fitting such as the metal snap shackle thus has many drawbacks.

Still another method of fastening a rope or cable to an object is the use of a mechanical knot. For instance, U.S Pat. Nos. 4,872,240 and 4,918,785 issued to Spinner et al on Oct. 10, 1989 and Apr. 24, 1990 respectively disclose tube-like devices for securing a rope and U.S. Pat. No. 5,577,299 issued to Thompson et al. on Nov. 26, 1996 discloses a semi-rigid spring-like device for also securing a rope.

A major drawback with prior art apparatus is those solutions are directed to attaching a single strand of rope in a knot configuration instead of attaching a spliced or tied loop in a hitch configuration. With the single strand configuration, there is the possibility of slippage of the end of the strand back through the knot, thus causing the knot to become untied. In addition, there is the awkwardness of the tail of left over rope sticking out of the mechanical knot. A mechanical knot which utilizes a double strand in a loop or hitch configuration does not have such drawbacks. U.S. Pat. No. 6,192,558 issued to Badura on Feb. 27, 2001 discloses a mechanical trucker's knot with locking clasp which utilizes a hitch type loop but pertains to a locking rope device mainly for tightening slack.

Another drawback with prior art mechanical knot inventions is their complicated and time consuming nature for attaching and detaching the rope. Especially in the field of sailing, one usually does not have the luxury of time or full dexterity from numb fingers to be able to operate such devices sufficiently.

Still another drawback from prior art mechanical knots is the sharp radius through which the rope must be bent. Rope becomes significantly weaker when bent around tight corners and it is not unreasonable for it to loose over 50% of its strength.

A device made by Tseil Tonshoff in Germany is used for a tow rope that suitable for creating a loop that can be placed around the object that is to be towed. Typically, this is an automobile. The design of this device does not allow it to be removed from the line as the opening through the plastic body is sufficient only for a single line. Further, a double lock is not provided.

U.S. Pat. No. 525,770, issued on Sep. 11, 1894, to Edward F. Parker, discloses a rope hitching device, having a concave plate from which two spiral sleeves extend in opposite directions for attaching two ends of a rope together for securing a rope to a hitching post.

U.S. Pat. No. 749,847, issued on Jan. 19, 1904, to Wallace B. Curtis, discloses a bale-tie device consisting of a metal plate having a double line of locking slots and notches for connecting two ends of a bailing line.

U.S. Pat. No. 1,452,338, issued on Apr. 17, 1923, to William J. Flowers, discloses a rope and cable tie comprising of a U-shaped channel cross member with slots into which part of the rope is inserted and fed back through so as to form a slip-proof loop.

U.S. Pat. No. 1,613,635, issued on Jan. 11, 1927, to John O. E. Zimmerlund, discloses a rope fastening device comprising of a plate which two holes whereas one hole is enlarged.

U.S. Pat. No. 1,718,641, issued on Jun. 25, 1929, to Henry E. Forman, disclosed a rope fastener consisting of a slotted U-shaped channel which side bars into which a rope can be knotted around.

U.S. Pat. No. 2,595,806, issued on May 6, 1952, to Edward L. Morris, discloses a rope fitting comprising of a grooved cylinder which a hook on its end. The rope can be seated into the grooves and tied so as to prevent slippage.

U.S. Pat. No. 3,094,755, issued on Jun. 25, 1963, to Jean C. Casanave, discloses a rope and connector assembly particularly useful for securing boats and consists of two parallel tubular passages through which a rope can be passed to form a slip-proof loop.

U.S. Pat. No. 4,872,240 issued on Oct. 10, 1989, to Ralphael F. Spinner et al., discloses a steel knot-type device comprising of two metal rings held together by a multitude of connectors consisting of a length of pipe or tube with one or more elongated slotted portions in its walls.

U.S. Pat. No. 4,918,785 issued on Apr. 24, 1990, to Ralphael F. Spinner et al., discloses a length of pipe or tube with one or more elongated slotted portions in its walls.

U.S. Pat. No. 5,577,299 issued on Nov. 26, 1996, to Carl. W. Thompson et al., discloses a quick-release mechanical knot device consisting of a semi-rigid elongated stock member having at least two circular orifices formed at opposite ends of a curvilinear intermediate portion.

U.S. Pat. No, 5,766,700, issued on Jun. 16, 1998, to Cedric M. Borcherds, discloses a loop fastening device comprising of a hollow conical body with an opening at its base and a slotted aperture at its apex.

U.S. Pat. No. 6,192,558, issued on Feb. 27, 2001, to Michael W. Badura discloses a mechanical trucker's knot with locking clasp which utilizes a hitch type loop but pertains to a locking rope device mainly for tightening slack.

U.S. Pat. No. 6,460,226, issued on Oct. 8, 2002 to Dennis Ray Smith et al., discloses a method and device for securing a knot comprising a tubular member around which a prestretched elastomeric band which is disposed in a manner similar to placing "shrink wrap" tubing around the knot.

SUMMARY OF THE INVENTION

It is an aspect of the invention to provide an improved mechanical knot device that overcomes the deficiencies of prior art mechanical knot designs.

It is another aspect of the invention to provide an improved mechanical knot device which attaches a spliced or knotted loop in a hitch-type knot fashion.

It is another aspect of the invention to provide an improved mechanical knot device which can be easily and quickly unfastened even after a tremendous load or strain has been applied.

It is another aspect of the invention to provide an improved mechanical knot device which can be unfastened in a manner similar to the way in which one "breaks the back" of a bowline type knot.

It is another aspect of the invention to provide an improved mechanical knot device which self-tightens itself when under load.

It is another aspect of the invention to provide an improved mechanical knot device which utilizes an optional flexible ring which can be slid by overcoming friction into the primary mechanical knot and aids in preventing the primary mechanical knot from becoming unfastened during severe flogging, that is, when the rope thrashes about in a whip-like manner as may be typically encountered in heavy sailing conditions.

It is another aspect of the invention to provide an improved mechanical knot device which consists of a spool-like body which possesses a slot or holes bored through the minor diameter of the spool in an orientation perpendicular to the axis of the spool.

Another object of the invention is to provide a mechanical knot device which can be used with a flexible line that is rope, cable, webbing and the like.

It is another aspect of the invention to provide a mechanical knot device which consists of a spool-like body with a slot or holes bored through the minor diameter and contains a secondary retaining pin inserted across the slot and between the two ropes of the rope loop so as to restrain the mechanical knot device from falling off and becoming detached from the loop.

It is another aspect of the invention to provide a mechanical knot device which is symmetric in geometry and has no preferred orientation so as to allow for attachment and detachment of the rope from either direction.

It is another aspect of the invention to provide a mechanical knot device which consists of a spool-like geometry in which the length, flange thickness, spool body major and minor diameter and slot or hole sizing is designed in the correct ratios so as to allow enough slack for the rope loop to wrap back over such spool when the device is being detached.

It is another aspect of the invention to provide a mechanical knot device which contains no sharp bends or edges for the rope to become cut or weakened.

It is another aspect of the invention to provide a mechanical knot device which contains no sharp points or edges on its exterior so as to prevent damage to surrounding objects during impacts from flogging.

It is another aspect of the invention to provide a mechanical knot device which consists of a spool-like body which contains optional cushioning material around its exterior to minimize impact damage on surrounding objects when subject to flogging.

It is still another aspect of the invention to provide a mechanical knot device which can be dimensioned to accommodate the diameter of the flexible line that is being used.

It is a final aspect of the invention to provide a mechanical knot device which consists of a spool-like body with a slot, slots or holes bored through the minor diameter and fastens a loop of webbing in the same fashion as the invention fastens a loop of rope or cable.

The invention is a mechanical knot apparatus which attaches a loop of rope, cable or webbing to another object in a hitch-type knot fashion. A mechanical knot device consisting of a spool-like body is provided. A slot or holes bored through the minor diameter of the spool in an orientation perpendicular to the axis of the spool is also provided. An optional retaining pin is provided which can be inserted across the slot and between the two corresponding loops of the rope loop inserted through the slot so as to restrain the mechanical knot device from becoming detached from the loop. An optional tightly fitting flexible ring is also provided which can be slid along the rope initiating at the root of the loop and into the mechanical knot so as to help restrain the loop from becoming unfastened from the spool during extreme flogging. A loop of rope is created at the end of the rope or somewhere along its length by either splicing or tying a knot to create such a loop. In the case of a pre-existing spliced loop, the apex of such loop is then passed through the slot of the spool-like body and an optional retaining pin is inserted between the walls of such slot and between the corresponding two ropes which form such loop so as to restrain the spool-like body from becoming detached from such loop. In the case of a newly spliced loop or a loop created by a knot, the rope is passed through one hole through the spool-like body and the looped back through the second hole through the spool-like body and then spliced or tied so as to create a loop. Material is provided between the two corresponding holes through the spool-like body which act in the same manner as the retraining pin to prevent the spool-like body from becoming detached from such loop. The loop is then passed around the object to be attached and back over the flanges of such spool in a hitch-type fashion. The optional tightly fitting flexible ring is either slipped over the loop before the spool-like body is attached, or is slid over the opposite end of the rope and all the way up and over the loop. Such flexible ring is then seated up against the hitch-type connection and prevents such connection from becoming unattached during flogging. The flexible ring is held in place by friction and can be slid back away from such connection when the mechanical knot is to be detached. The mechanical knot device is detached from the attached object by bending the two ropes originating from the root of the formed rope loop back and around the minor diameter of the spool-like body. This allows the apex of the loop to be rolled back around the same minor diameter of the spool-like body and provides free slack about the apex of such loop. The corresponding free slack allows the apex of such loop to be wrapped back over and around the flanges of the spool-like body and then detached from the object previously attached.

DETAILED DESCRIPTION OF THE INVENTION

Figure 1A:
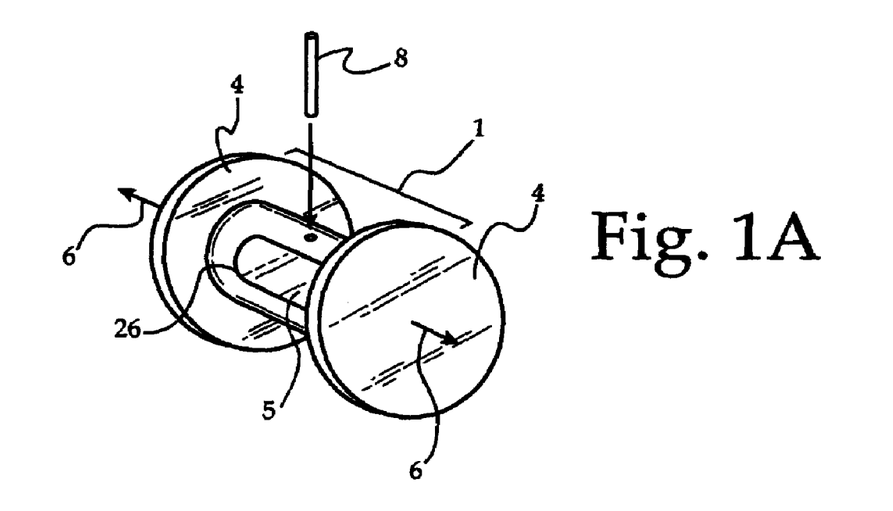
FIGS. 1A, 1B, 1C illustrate the preferred embodiment of the mechanical knot apparatus in accordance with the invention for use with a pre-spliced rope loop, showing isometric, front, and end views.
Figure 1B:
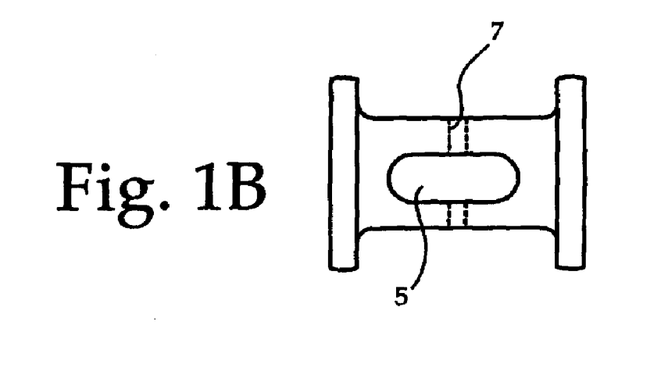
Figure 1C:
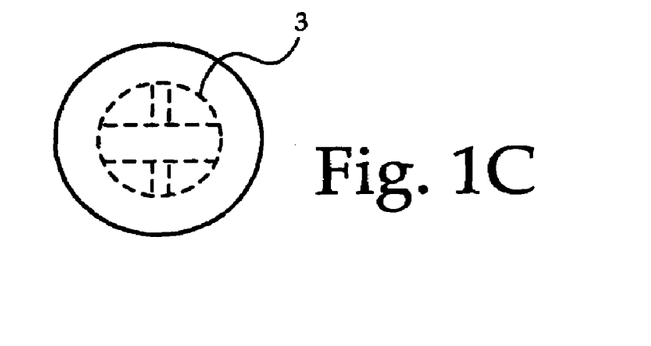

FIG. 1 illustrates the invention in the preferred embodiment for use with a pre-spliced rope loop. Spool-like member 1 contains a minor spool diameter 3 and flanges 4. Spool 1 also contains slot 5 cut through minor spool diameter 3 and cut perpendicular to the major axis 6 of spool 1. The slot is dimensioned in accordance with the diameter of the flexible line or roper. The edges 26 of slot 5 are rounded so as to prevent chaffing. Spool 1 also contains cross hole 7 drilled through minor diameter 3 which also bisects slot 5. Retaining pin 8 can be inserted into hole 7.

Figure 2A:
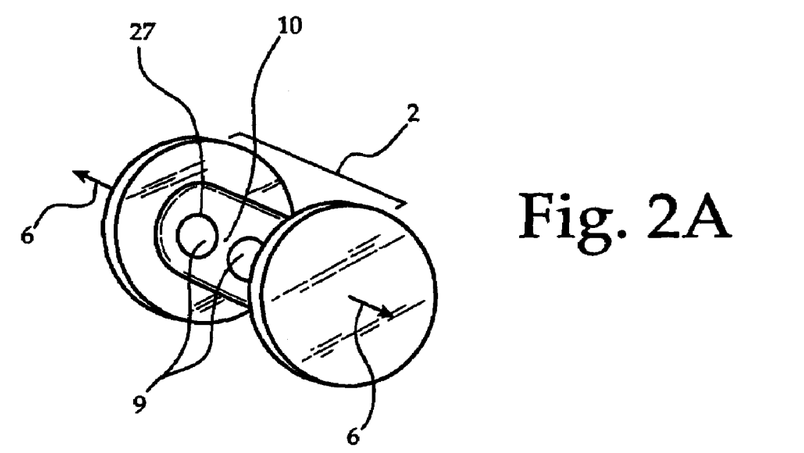
FIGS. 2A, 2B, 2C illustrates an alternative embodiment for use with an unspliced free rope, again showing isometric and front and end views.
Figure 2B:
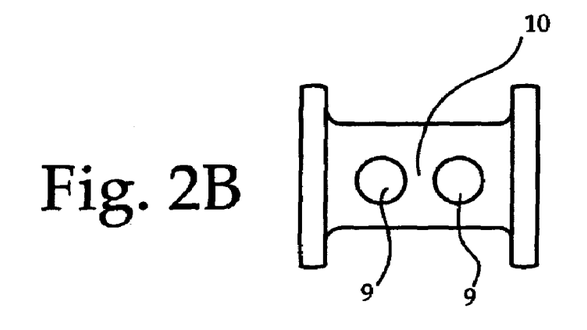
Figure 2C:
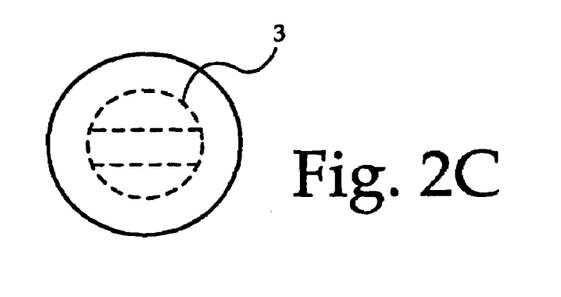

FIG. 2 presents an alternative embodiment for use with an unspliced free rope. Alternate spool-like member 2 contains two through holes 9 drilled through minor diameter 3 and perpendicular to the major axis 6. Material stock 10 is left between holes 9. The edges 27 of holes 9 are rounded to prevent chaffing.

Figure 3A:
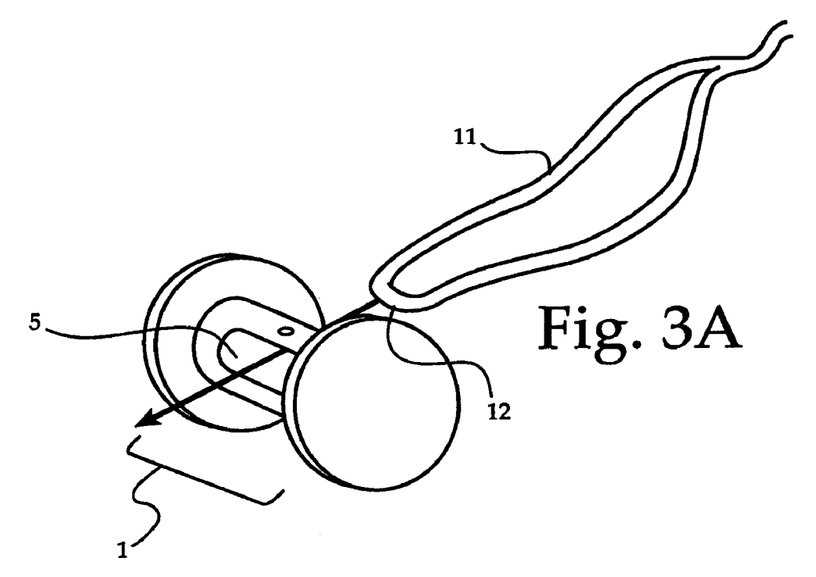
FIGS. 3A, 3B, 3C illustrates how the rope is inserted into apparatus of FIGS. 1A-1C when utilizing a pre-spliced loop.
Figure 3B:
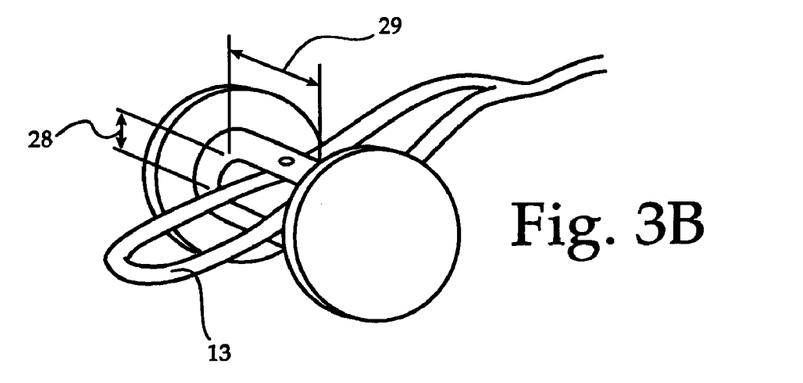
Figure 3C:
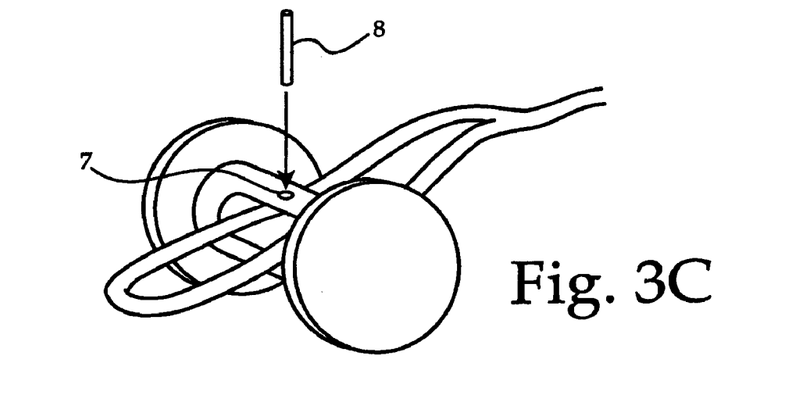

FIG. 3 illustrates how a pre-spliced rope loop 11 is inserted through spool 1. While rope is preferable material for sail boat applications, the apparatus can also be used with cable or webbing. The apex 12 of rope loop 11 is inserted through slot 5 pulled out the other side. Slot 5 is made of height 28 dimensions so that rope diameter 13 will fit through slot 5. Slot 5 is made of width 29 dimensions so that at least two diameters 13 can fit side by side through slot 5. Retaining pin 8 is inserted into cross hole 7 after rope loop 11 has been inserted. Retaining pin 8 prevents rope loop 11 from sliding back out of slot 5.

Figure 4A:
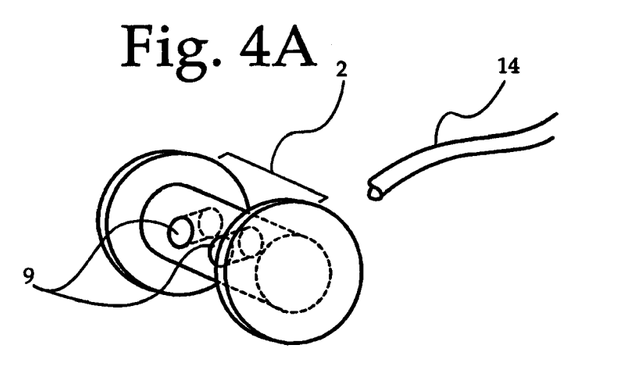
FIGS. 4A, 4B, 4C illustrates how the rope is inserted into the apparatus of FIGS. 2A-2C when utilizing a free rope.
Figures 4B, 4C:
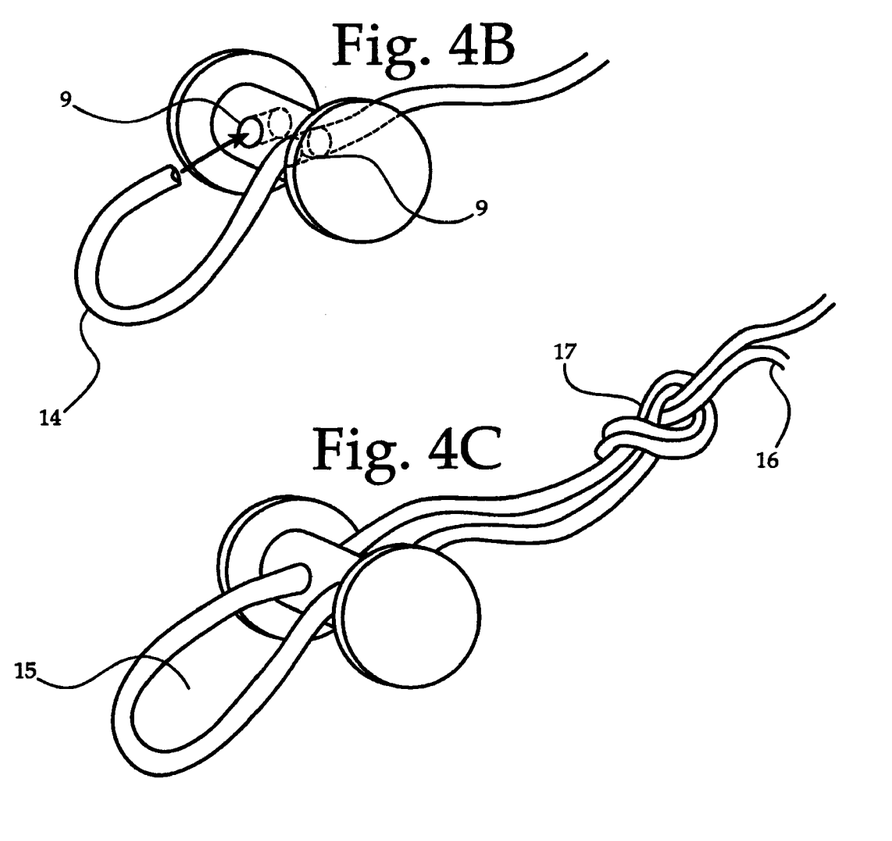

FIG. 4 illustrates how an unspliced free rope 14 is inserted into spool-like member 2. Free rope 14 is inserted through one of the two holes 9 and pulled out the other side. Free rope 14 is then passed back through the remaining one of the holes 9 and again pulled out through the other side. Enough rope is pulled to created loop 15 which may have a diameter of approximately 10 times that of minor spool diameter 3. The end 16 of free rope 14 is then tied to create overhand or figure eight type knot 17 which secures loop 15.

Figure 5:
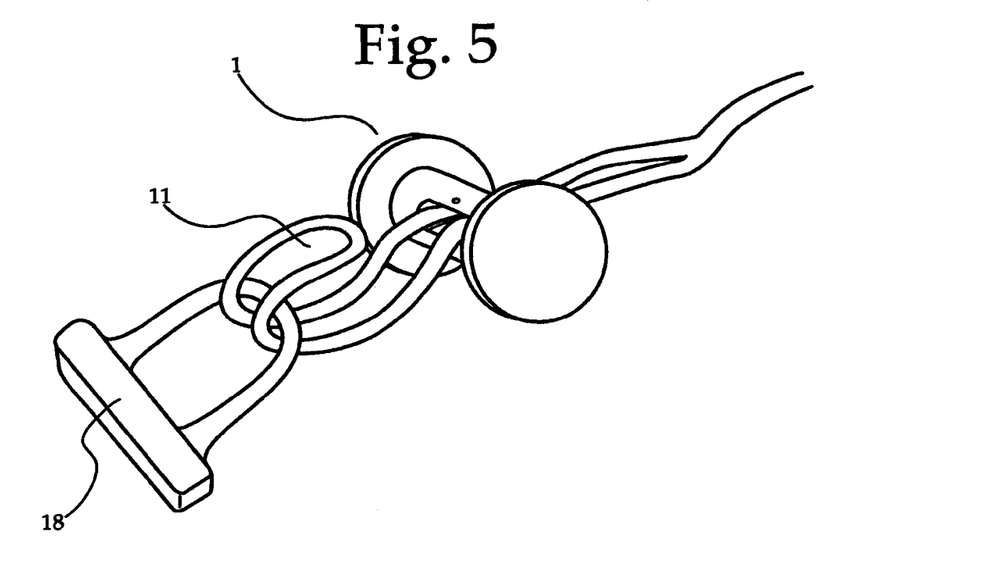
FIG. 5 illustrates how the rope is then wrapped around the object to be secured.

FIG. 5 illustrates how rope loop 11 is wrapped around an object to be secured 18. Rope loop 11 is passed around secured object 18 and then pulled back toward spool-like member 1.

Figure 6:
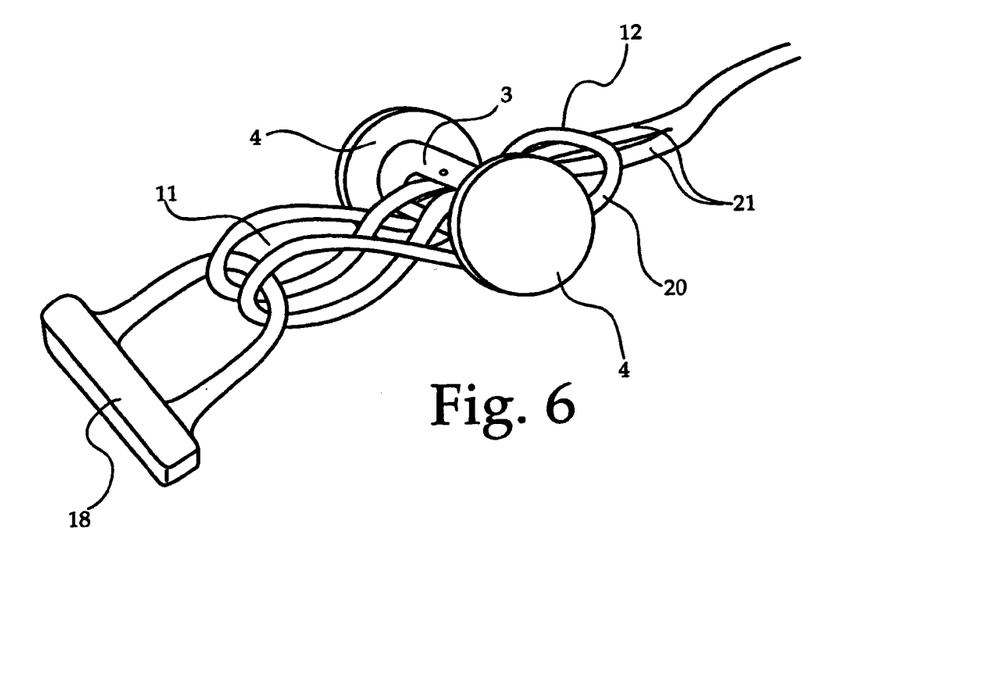
FIG. 6 illustrates how the rope is then looped back around the flanges of the spool-like device in a hitch-like fashion.

FIG. 6 illustrates how rope loop 11 is then wrapped back around the flanges 4 of spool 1 to form a hitch type connection 19. Rope legs 20 initiating from loop apex 12 pass over rope legs 21 initiating from loop splice 22 and wrap between spool flanges 4 and spool minor diameter 3.

Figure 7:
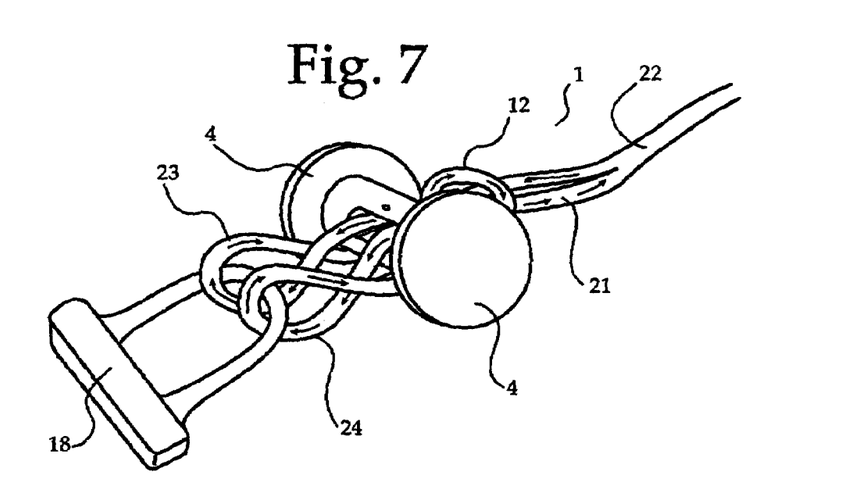
FIG. 7 illustrates how the mechanical knot invention is cinched up against the object being secured.

FIG. 7 illustrates how spool-like member 1 is cinched up against object to be secured 18. Rope legs 21 are pulled back through rope loop apex 12 so that secondary loops 23 and 24 tighten around secured object 18. Secured object 18 then seats up against spool flanges 4 as tension is applied.

Figure 8:
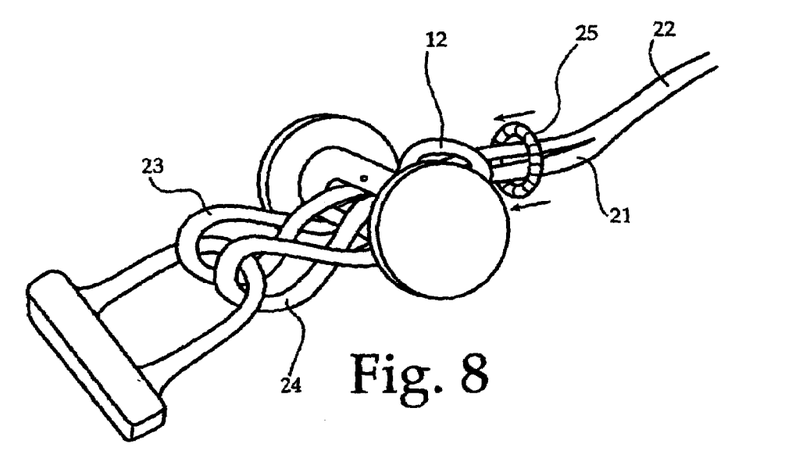
FIG. 8 illustrates how a flexible ring is slid up against the hitch-like connection to act as a lock and restrain the knot from becoming detached during flogging.

FIG. 8 illustrates how optional flexible ring 25 can be slide around rope legs 21 and up against loop apex 12 so as to prevent loop apex 12 from loosening from spool-like member 1 during severe flogging or slack in tension. Flexible ring 25 is made from and elastic-like material and grips rope legs 21 because of friction. Flexible ring 25 can be slid back away from rope apex 12 and back toward rope splice 22 when the mechanical knot invention is to be unfastened.

Figure 9:
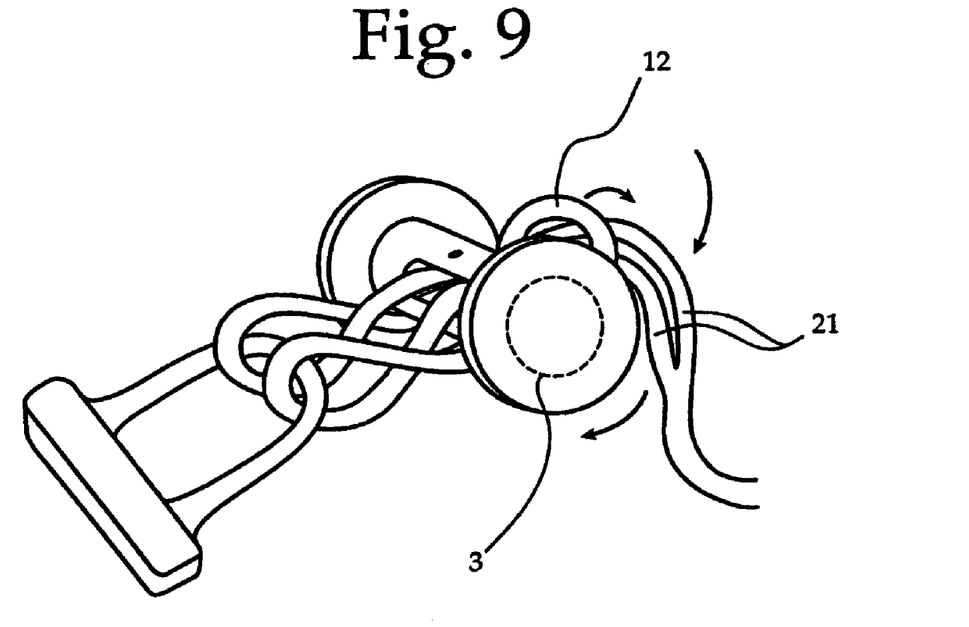
FIG. 9 illustrates how the mechanical knot device is untied by "breaking the back" of the loop as in the same fashion as untying bowline types knot.

FIG. 9 illustrates how the mechanical knot invention is unfastened. Rope legs 21 are first bend and rolled back around minor spool diameter 3 in the fashion that one "breaks the back" of a bowline type knot. Once rope legs 21 have been rolled back around minor diameter 3, rope loop apex 12 is then bent back and slide back over rope legs 21 which creates free slack between rope loop apex 12 and rope legs 21.

Figure 10:
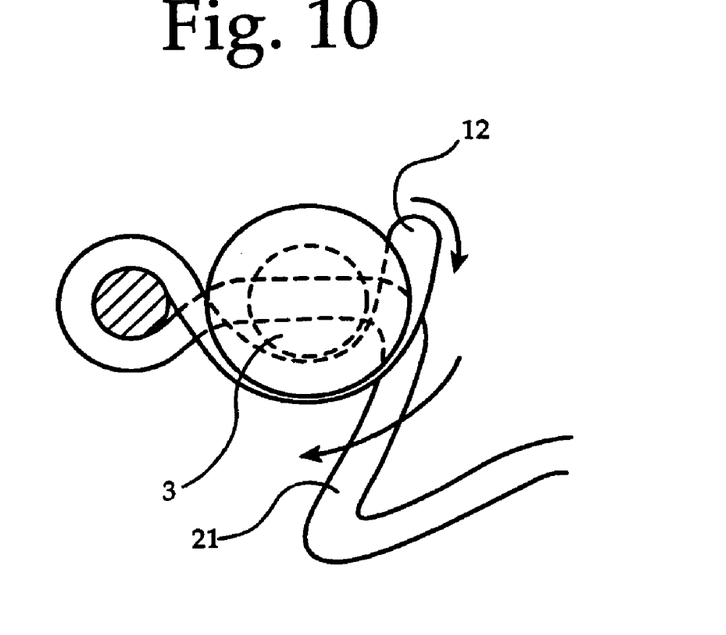
FIG. 10 illustrates how the mechanical knot device is untied by presenting a side view.

FIG. 10 illustrates the same unfastening technique as FIG. 9, but with the use of a side view illustration.

Figure 11:
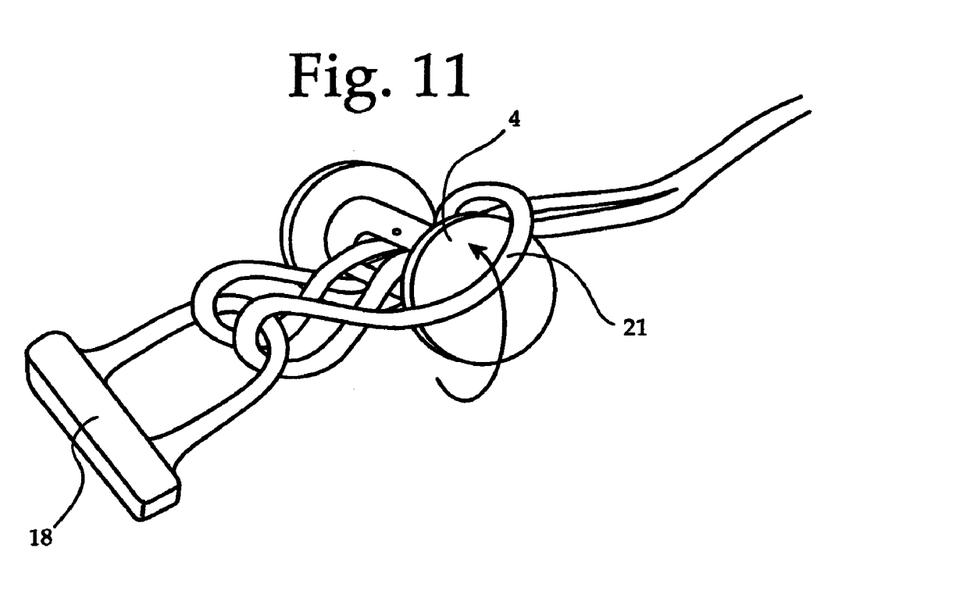
FIG. 11 illustrates how the rope is next unfastened from the object being secured.

FIG. 11 illustrates how the line is finally unfastened from the secured object. One of the two rope legs 21 is passed over flange 4. The second of the rope legs 21 is then passed over the second spool flange 4 whereas rope loop 11 can then be unwrapped from secured object 18. The secured object 18 is now unfastened from loop 11. Alternate spool variation 2 using the knotted free rope 14 detaches in the identical manner as spliced loop 11.

It is should be noted that the length, flange thickness, spool body major and minor diameter and slot or hole sizing is dimensioned in accordance with the diameter and characteristics of the rope or cable that is being used. One important criteria is to provide enough slack for the rope loop to wrap back over such spool when the invention is being detached.

The spool material can be made from metal, plastic, wood, composite, or any other suitable engineering material. It is also noted that the spool can be coated with a rubber like material so as to prevent impact damage to objects when severe flogging occurs. It is finally noted that the invention may also be used with cable-like material other than rope such as, but not limited to, steel cable, wire rope, webbing, strapping, chain, etc.

The illustrated embodiments of the invention are intended to be illustrative only, recognizing that persons having ordinary skill in the art may construct different forms of the invention that fully fall within the scope of the subject matter disclosed herein. Other features and advantages of the invention will be apparent from the descriptions hereof.

What is claimed is:

1. A mechanical knot apparatus which attaches a loop of flexible line having a diameter to an object in a hitch-type knot fashion, said apparatus comprises:

spool-shaped body having a major axis and a minor axis and opposing flanges;

a slot perpendicular to the major axis of said spool-shaped body and positioned through the minor axis of said spool-shaped body with said slot having a long axis that is at least as great as twice the diameter of said flexible line and a short axis that is at least as great as the diameter of said flexible line; and a cross hole perpendicular to the major axis of said spool-shaped body and positioned through the minor axis of said spool-shaped body, substantially bisecting said slot;

a retaining pin dimensioned to fit within said cross hole to prevent the loop of said flexible line from sliding back out of slot, wherein the loop of said flexible line is inserted through said slot and said retaining pin is inserted therein, then the loop of said flexible line is wrapped back around the opposing flanges of said spool-shaped body, cinching said apparatus up against the object that said apparatus is to be secured thereto.

2. The mechanical knot apparatus of claim 1 further comprising a flexible ring dimensioned in accordance with the diameter of said flexible line wherein said flexible ring is slid along said flexible line toward said mechanical knot apparatus such that said flexible ring retains the loop from becoming unfastened from said apparatus during flogging of said flexible line.

3. The mechanical knot apparatus of claim 1 wherein said slot has rounded edges to prevent chaffing of said flexible line fitted through said slot.

* * * * *